Patented Jan. 30, 1940

2,188,890

UNITED STATES PATENT OFFICE 2,188,890

OLEFINIC CONDENSATION PRODUCT COMBINED WITH A PHENOL AND METHOD

Edwin T. Clocker, Bethlehem, Pa.

No Drawing. Application September 27, 1937,
Serial No. 165,899

11 Claims. (Cl. 260—18)

My invention relates to methods of producing an improved condensation product suitable for use in resins, lacquers, varnishes, enamels, plastic masses, and for other similar purposes, and the new product so produced.

This application is a continuation in part of my copending applications, Serial 759,086, filed December 24, 1934 and Serial No. 117,243, filed December 22, 1936, both for Condensation product and method. Serial No. 759,086 includes the generic claims and certain species relating to the condensation of an acyclic olefinic acid having less than ten carbon atoms in the carbon chain or its ester, with a nonconjugated unsaturated nonhydroxylated aliphatic acid having from ten to twenty-four carbon atoms in the carbon chain, or a salt or ester thereof. Serial No. 117,243 relates particularly to the maleic species. Serial No. 165,898, filed September 27, 1937, for Condensation product and method, includes the subject matter relating to salts and esters of the condensation product. Serial No. 165,900, filed September 27, 1937, for Coating product and method, is concerned particularly with coating. Serial No. 231,759, filed September 26, 1938, for Condensation product and method, is directed to the reaction product of the condensation product with a basic dyestuff. Serial No. 231,760, filed September 26, 1938, for Condensation product and method, is directed to water insoluble metallic salts. Serial No. 231,761, filed September 26, 1938, for Oily dispersion material, covers oils, fats and waxes emulsified by the condensation product of the invention. Serial No. 345,252, filed October 15, 1938, for Condensation product and method, is directed to condensation with oleic acid and its compounds.

A purpose of the invention is to produce an improved condensation product by causing condensation between one of the group consisting of acyclic olefinic alcohols, acyclic olefinic aldehydes, acyclic olefinic acids, esters of these and alkyl derivatives of these, all having less than ten carbon atoms in their carbon chains, and one of the group consisting of nonconjugated unsaturated nonhydroxylated fatty acids having from ten to twenty-four carbon atoms in the carbon chains, salts and esters thereof, and to recondense said condensation product with another resin-forming or resinifying compound, desirably a phenol or a phenol and an aldehyde.

A further purpose is to cause a condensable ethylene type compound having less than ten carbon atoms in its carbon chain to attach to the carbon chain of a nonconjugated unsaturated nonhydroxylated fatty acid or the like by suitable application of heat and, desirably also pressure, and to recondense the condensation product with another resin-forming or resinifying compound. A temperature of between 150° C. and 300° C. or higher is suitable for the first condensation reaction, 180° to 260° C. being the most satisfactory range.

A further purpose is to cause the first condensation using one molecular equivalent of the ethylene type compound to one molecular equivalent of a nonconjugated unsaturated nonhydroxylated carbon chain compound having from ten to twenty-four carbon atoms in the chain.

A further purpose is to partially or completely saturate the double bonds of the nonconjugated unsaturated nonhydroxylated fatty acid, fatty oil or the like during the initial condensation.

A further purpose is to cause maleic anhydride or the like to condense with a drying oil such as linseed oil and then to recondense the condensation product with a phenol or a phenol and an aldehyde.

A further purpose is to recondense the condensation product of a condensable ethylene type compound having less than ten carbon atoms in its carbon chain and a nonconjugated unsaturated nonhydroxylated fatty acid, fatty oil or the like with a suitable substance such as a phenol with or without a condensing agent such as hexamethylenetetramine.

A further purpose is to recondense the condensation product of an olefinic compound as above referred to having less than ten carbon atoms in its carbon chain and a nonconjugated unsaturated nonhydroxylated aliphatic acid or the like having from ten to twenty-four carbon atoms in the carbon chain, with a plurality of condensing agents, such as a phenol and an aldehyde in themselves having a tendency to condense.

A further purpose is to recondense the condensation product of an olefinic compound as above referred to having less than ten carbon atoms in its carbon chain and a nonconjugated unsaturated nonhydroxylated fatty compound having from ten to twenty-four carbon atoms in its carbon chain and another reactive resin-forming or resinifying substance such as benzoyl benzoic acid, with one or more other substances such as a phenol or a phenol and an aldehyde.

A further purpose is to produce an improved varnish or the like by gelling the condensation product of maleic anhydride or the like with a drying oil prior to recondensation with a phenol or a phenol and an aldehyde.

A further purpose is to introduce a drier directly into the product of recondensation by causing a suitable metallic compound having drying properties to react with the acidic group of the olefinic acid before the first condensation, or with the acidic group of the condensation product resulting from the first condensation, so that certain of the molecules of the condensation product at the beginning of the recondensation will be united with the drier metal. The drier metal will of course combine with only some of the acidic groups.

Further purposes appear in the specification and in the claims.

It has been known for some time that maleic anhydride or substances yielding maleic anhydride will condense with carbon chain compounds containing a conjugated system of double bonds. For example, Morrell, Marks and Samuels in British Patent No. 407,937 disclose a condensation of maleic anhydride with tung oil, a conjugated compound.

I have discovered that, under suitable conditions, maleic anhydride and compounds which behave similarly, as discussed below, will react with nonconjugated unsaturated nonhydroxylated fatty oils and acids and similar compounds having from ten to twenty-four carbon atoms in the carbon chain and the condensation product thus obtained may be recondensed with a phenol or a phenol and an aldehyde to produce a desirable condensation product.

To produce the maleic condensation product, the maleic grouping must be present in condensable form, preferably as maleic anhydride. The condensation is of course obtained from any of the compounds which yield maleic anhydride and the like, such as malic acid, fumaric acid, maleic acid, aconitic acid or citric acid, if subjected to the conditions under which maleic anhydride is produced. The production of maleic anhydride from such other acids is well known in the art (Bernthsen, Textbook of Organic Chemistry (1923) pages 250-256). Instead of maleic anhydride, an ester of maleic acid, whether an acid or completed ester, or a substituted maleic acid having less than ten carbon atoms in its carbon chain may be used.

These maleic compounds contain or produce the grouping

where R is one of the class consisting of hydrogen and alkyl groups and T is one of the class consisting of carboxyl acidic groups, anhydrides thereof and esters of both and the length of the carbon chain

is less than ten carbon atoms.

As explained herein in order to avoid a mere esterification of alcohol groups, as distinguished from a condensation at the double bond, the oil or similar compound should be nonhydroxylated. Where necessary, precautions should be used to avoid hydroxylation by hydrolysis or otherwise. As well known in the art, in order to prevent or minimize hydrolysis, the reacting components should be reasonably dry, and water formed by decomposition of a reacting ingredient during the reaction should be removed. For example, if maleic acid (as distinguished from the anhydride) is caused to react with an oil or similar compound, it is preferable to use a relatively high temperature to cause rapid reaction, and it is preferable to permit elimination of the water formed by decomposition of the maleic acid into maleic anhydride, as by permitting distillation and avoiding refluxing. Where maleic anhydride or a similar compound not producing water by decomposition is to be used, the desirability of avoiding refluxing of course ceases.

Wherever reference is made herein to maleic anhydride, it will be understood that I include substances which yield maleic anhydride if subjected to the conditions at which maleic anhydride is produced. I also include substituted maleic acids having less than ten carbon atoms in their carbon chains, and other equivalents.

Wherever I refer herein to an acid or to an acid group, I of course include an acid anhydride and an acid anhydride group, and vice versa, as well as a half ester of an acid. Wherever I refer to an ester, I include also a half ester.

Investigation of a large number of compounds has shown that condensation with a nonconjugated unsaturated nonhydroxylated aliphatic acid having from ten to twenty-four carbon atoms in the carbon chain is generally characteristic of chain compounds having the ethylene linkage and having less than ten carbon atoms in the carbon chains, which are substituted on one or both sides of the double bond to form alcohols, aldehydes, acids or acid anhydrides, or esters or half esters thereof, or similar compounds. These compounds are olefinic as they are acyclic and have the ethylene linkage. Such olefinic compounds are mono-substituted when they contain only one alcohol, aldehyde, acid, acid anhydride or esterified group; for example allyl alcohol, acrolein, crotonic acid, vinyl acetate. Such olefinic compounds are di-substituted when they contain two alcohol, aldehyde, acid, acid anhydride or esterified groups; for example maleic anhydride, citraconic anhydride, maleic acid, methyl maleate.

When I refer to the elefinic compound of less than ten carbon atoms in the carbon chain as having the ethylene linkage in condensable form, I means to indicate that the compound is not a hydrocarbon, for example, but that it is an alcohol, aldehyde, acid or acid anhydride, or an ester, or half ester thereof, or a similar compound which will condense with a nonconjugated unsaturated nonhydroxylated fatty acid or the like having from ten to twenty-four carbon atoms in the carbon chain.

The longer the carbon chain of the substituted olefinic alcohol, aldehyde, acid or acid anhydride, or ester or half ester thereof, or similar compound, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain. In the case of any ester of the elefinic compound, the carbon chain of the olefinic compound should have less than ten carbon atoms, the carbon chain of the compound added by esterification not being counted.

In all cases where I refer in the specification to less than ten carbon atoms in the carbon chain of the elefinic compound, it will be understood that a more vigorous reaction is obtained with compounds having less than seven carbon atoms in the carbon chain, and a still more vigorous reaction with compounds having less than five carbon atoms in the carbon chain. These latter groups (less than seven and less than five) are to be taken as expressly included, although not specifically mentioned because of a desire to shorten the specification.

It will of course be apparent that an attempt to condense maleic anhydride or the like with a nonconjugated unsaturated hydroxylated aliphatic acid having from ten to twenty-four carbon atoms in the carbon chain, or a salt or ester thereof, will result in esterification between the acidic group of maleic anhydride and the hydroxyl group or groups in the aliphatic acid, salt or ester. Condensation between the maleic anhydride or the like and the carbon chain of the hydroxylated aliphatic acid, salt, or ester, will only take place after esterification is complete, and in case maleic anhydride or the like in excess of that consumed by the esterification is present in contact with the esterified hydroxylated aliphatic acid, salt or ester under the proper conditions.

The esterification of course produces a change in properties, and the condensation product of a hydroxylated aliphatic acid, salt or ester can in general be given properties comparable with those of the condensation product of a nonhydroxylated aliphatic acid, salt, or ester, only by destroying the esterification of the maleic anhydride or the like, as by hydrolysis.

Due to the difficulty in obtaining a condensation reaction between maleic anhydride or the like and a nonconjugated unsaturated hydroxylated aliphatic acid having from ten to twenty-four carbon atoms in the carbon chain, due to the change in properties caused by esterification, and due to the difficulty of decomposing the ester, the claims have generally been drawn to exclude hydroxylated aliphatic acids, salts and esters. This means that such acids, salts and esters are not sufficiently hydroxylated to interfere with the condensation by esterification. Oils which are polymerized by blowing with air are usually hydroxylated.

In those cases where the claims do not exlude hydroxylated aliphatic acids, salts and esters, it will be understood that more than mere esterification is intended—there should be condensation at a point of unsaturation on the carbon chain of the acid, salt or ester.

When reference is made to the maleic grouping in condensable form, it will be understood that it is intended to designate maleic anhydride, a substance yielding maleic anhydride or a maleic ester or similar compound which is capable of condensing to enter the carbon chain of a nonconjugated unsaturated nonhydroxylated aliphatic compound having from ten to twenty-four carbon atoms in the carbon chain. A maleic condensation product may be obtained from any such compound having the maleic grouping, preferably maleic anhydride.

A wide variety of nonconjugated unsaturated nonhydroxylated carbon chain compounds having from ten to tewnty-four carbon atoms in the carbon chain may be employed. Esters of fatty acids with mono-, di- or poly-hydric alcohols, for example glyceryl or glycol esters, are particularly desirable. The free fatty acids may also be used. Salts of the fatty acids (soaps) may likewise be employed.

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to a glyceryl group.

As examples of the type of nonconjugated unsaturated nonhydroxylated aliphatic acids having from ten to twenty-four carbon atoms in the carbon chain which I may use, I suggest oleic, linoleic, linolenic, clupanodonic and undecylenic. The esters of the nonhydroxylated fatty acids may be either glyceryl esters, which form oils such as corn, olive, cotton seed, peanut, linseed, sunflower, safflower, perilla, hemp seed, walnut seed, soya bean, rape seed, tomato seed, neat's foot, lard, codliver, cod, burbet, salmon, menhaden, and many others, all nonconjugated unsaturated nonhydroxylated fatty oils; or esters of other alcohols, for example glycol esters. It will furthermore be understood that mixtures of various esters, or of the esters and the free fatty acids, or of salts of the acids, may be employed if desired.

When I refer to the grouping of a nonconjugated unsaturated nonhydroxylated aliphatic acid having from ten to twenty-four carbon atoms in the carbon chain, I mean to include the acid, and compounds of the acid such as esters of the acid, whether with mono-, di- or poly-hydric-alcohols, and salts of the acid. I do not include herein hydroxylated aliphatic acids, oils, etc., because, while the condensation of my invention may in certain cases be obtained with them, special precautions must be taken because of the tendency of hyroxylated fatty acids, oils, etc., to esterify and gel. Typical hydroxylated fatty oils are castor oil and cashew nut shell oil. The question of whether the free acid or the ester or the salt is used is immaterial from the standpoint of the condensation reaction because the condensation reaction with the maleic anhydride appears to involve the carbon chain at an intermediate point between its ends, rather than the carboxyl group or neutralized carboxyl group at the end of the chain. Of course, the character of the product will vary depending upon whether the acid, ester or salt is used.

In the first condensation, I may desirably employ one molecular equivalent of nonconjugated unsaturated nonhydroxylated acid or the like to one molecular equivalent of olefinic alcohol, aldehyde, acid, ester on alkyl derivative thereof, and subject the mixture to a temperature of between 150° C. and 300° C. (more desirably between 180° C. and 260° C.) and preferably also to high pressure to facilitate the reaction. The temperature may in some cases be carried somewhat above 300° C., if the reacting components can stand such high temperatures. Pressure may desirably be applied by simply confining the reaction components between the walls of some vessel such as a pressure autoclave and then heating the reaction components. Pressure may also be applied in any other suitable way, as by pumping the reaction components into the vessel or introducing an inert gas under pressure. I have used pressures up to 300 pounds per square inch with success. Of course the desirable pressure will vary with the individual reaction.

A suitable catalyst may be used to accelerate the reaction and to increase the yield. I do not, however, find that a catalyst is necessary.

The condensation reaction may be carried out in the presence of suitable solvents, although this is not usually necessary.

In ordinary practice I prefer not to use sufficient olefinic alcohol, aldehyde, acid, ester or alkyl derivative thereof, each having less than ten carbon atoms in the carbon chain, to saturate all of the double bonds in the fatty acid or fatty oil, etc., having from ten to twenty-four carbon atoms in the carbon chain. The condensation product thus ordinarily has an iodine value. Generally it is sufficient to saturate one-sixth to one-third of the double bonds in the fatty acid, fatty oil, etc. Thus in olive oil one-third of the double bonds (one) is ordinarily saturated, and in linseed oil one-sixth (one). But in individual cases it may be desirable to satisfy more ethylene linkages in the fatty acid or fatty oil, and even to completely saturate them. To saturate all of the ethylene linkages in linseed oil, six molecular equivalents of olefinic compound having less than ten carbon atoms in the carbon chain are caused to react with one molecular equivalent of linseed oil.

Examples 1 to 7 given below, clearly indicate the way in which the first condensation product is obtained:

Example 1

In a pressure autoclave, 180 parts by weight of raw alkali-refined linseed oil are mixed with 20 parts by weight of maleic anhydride. The temperature is maintained at from 250° C. to 260° C. for about one hour, a pressure of about 30 pounds per square inch developing. The reaction may be obtained satisfactorily at 150° C., but is much slower at this low temperature, and the temperature may be raised to as much as 300° C., or even somewhat higher, but a high temperature may cause some difficulty due to carbonization. After cooling, the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of nitrocellulose in all proportions. The iodine value is 141.4, as against 190.0 for the original linseed oil. The saponification value is 288 and the acid value is 52.9, in the presence of ethyl alcohol.

Example 2

Into a three-neck flask, equipped with a thermometer, mechanical stirrer and reflux condenser, 200 parts by weight of distilled oleic acid and 60 parts by weight of maleic anhydride are placed and heat is applied until the temperature of the mixture reaches 180° C.

The temperature is gradually raised from 180° C. to 260° C. over a period of one hour, during which time the amount of maleic anhydride condensed under the reflux progressively diminishes. The temperature is maintained at 250° C. to 260° C. until no more maleic anhydride appears to condense under the reflux. The temperatures given are those found best for carrying out the reaction, although temperatures between 150° C. and 300° C., or even somewhat higher, may be used.

The condensation product is soluble in ethyl alcohol, ether, xylene, carbon tetrachloride and solutions of nitrocellulose, but is substantially insoluble in petroleum hydrocarbons and fatty oils.

Example 3

To 180 parts by weight of linseed oil are added 25 parts by weight of citraconic anhydride (a substituted maleic anhydride) and the mixture is heated in a three-neck flask, equipped with a reflux condenser, at about 250° C. for about three-quarters of an hour. At the end of this period, no further citraconic anhydride appears to condense under the reflux, indicating completion of the reaction. As a precaution, heating is continued for about 15 minutes longer. The reaction product is less viscous than the maleic condensation product of linseed oil obtained in Example 1, but has the same properties otherwise.

Example 4

A mixture of 25 parts by weight of linseed oil and 2.4 parts by weight of crotonic acid (an olefinic acid) are heated under pressure at about 250° C. for about two hours. The condensation product has similar properties to the maleic-linseed oil condensation product obtained in Example 1.

Example 5

A mixture of 1000 parts by weight of linseed oil and 68 parts by weight of allyl alcohol (an olefinic alcohol) are heated under pressure at about 250° C. to 260° C. for about three and one-half hours. The condensation product is soluble in 95% ethyl alcohol, somewhat soluble in petroleum ether, soluble in nitrocellulose solutions, and difficultly soluble in acetic anhydride. From the acetyl value, determined after removal of the unreacted allyl alcohol by heating, it was found that about 70% of the theoretical quantity of allyl alcohol reacts under the above conditions. The condensation product is a slow drying oil.

Example 6

A mixture of 25 parts by weight of linseed oil and 2.5 parts by weight of vinyl acetate (an olefinic ester) are heated under pressure to about 250° C. for about two hours. The condensation product is soluble in alcohols, but substantially insoluble in petroleum hydrocarbons. This condensation product is a drying oil.

Example 7

A mixture of 900 parts by weight of linseed oil and 112 parts by weight of acid methyl maleate (a maleic half ester) are heated under pressure at about 250° C. for about two hours. If neutralized with an alkali, the reaction product forms an excellent dispersing agent as later explained.

My novel condensation product may be made with nonconjugated unsaturated nonhydroxylated drying, semidrying or nondrying fatty oils having from ten to twenty-four carbon atoms in the carbon chain, or mixtures of the same, and the characteristics of the product are, to some extent, dependent upon the character of the oils or the like employed in the reaction. For convenience, the group of semidrying oils is classed with the group of drying oils in the claims, so that a claim for a drying oil will include a semi-drying oil.

Without limiting myself to any exact structure for the first condensation product, it would appear that it is an addition product at a double bond in the carbon chain of the nonconjugated unsaturated nonhydroxylated fatty acid or the like to the condensable olefinic compound or the like. For example, if linolenic acid reacts with maleic anhydride, the first stage in the reaction appears to be in general as follows. Of course if enough maleic anhydride be present, the same reaction will take place at each double bond in the linolenic acid.

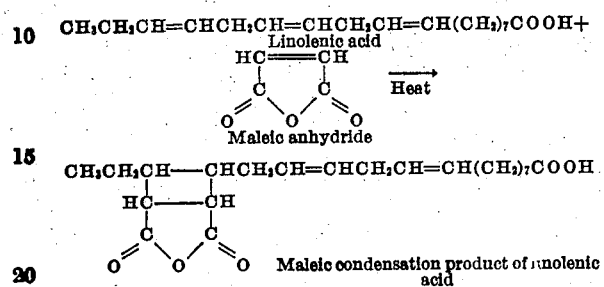

The iodine value of the first condensation product confirms the above formula, and indicates that the ethylene linkage of the olefinic compound (in this case maleic anhydride) has been lost during condensation. It should be noted that one of the double bonds in linolenic acid and the ethylene linkage in maleic anhydride appear to have disappeared in the condensation product forming a ring type compound with four carbon atoms in the ring.

The first condensation product appears to be characterized by the linkage:

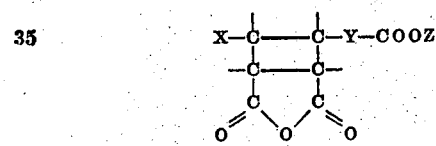

where X and Y are carbon chains without conjugated double bonds and Z is a hydrogen atom, a metal or an ester group.

The reaction above will be modified in well known manner if a glyceryl ester of linolenic acid instead of linolenic acid be used, or if some other nonconjugated unsaturated nonhydroxylated aliphatic acid having between ten and twenty-four carbon atoms in the carbon chain be employed, or if some other olefinic alcohol, aldehyde, acid, acid anhydride, ester, half ester, or alkyl derivative thereof, each having less than ten carbon atoms in its carbon chain, be used instead of or in mixture with maleic anhydride.

It should be noted that the olefinic acid or acid anhydride condensation product of linolenic acid or any similar acid has a carboxyl group capable of reacting at the end of the linolenic or other similar carbon chain, and also an olefinic acid group capable of reacting. The condensation will take place notwithstanding that both of these groups have been esterified before the condensation reaction, but the presence of the unesterified polar-reactive groups is of great advantage.

When maleic acid or a substance yielding maleic acid is condensed with a nonconjugated unsaturated nonhydroxylated fatty acid or the like, it appears to change to maleic anhydride and the maleic anhydride condensation product results.

*Recondensation*

The condensation reaction between an acyclic olefinic alcohol, aldehyde, acid, acid anhydride, ester, half ester or alkyl derivatives thereof, each having less than ten carbon atoms in the carbon chain, and having the ethylene linkage in condensable form, and a nonconjugated unsaturated nonhydroxylated aliphatic acid or the like having from ten to twenty-four carbon atoms in its carbon chain has been described in general.

It is possible to recondense the condensation product of an acyclic olefinic alcohol, aldehyde, acid, ester or alkyl derivative thereof, each having less than ten carbon atoms in the carbon chain and a nonconjugated unsaturated nonhydroxylated aliphatic acid or the like to produce more complex recondensed products. For example, the condensation product of such an olefinic compound having less than ten carbon atoms in the carbon chain and a nonconjugated unsaturated nonhydroxylated aliphatic acid or the like having from ten to twenty-four carbon atoms in its carbon chain may be condensed with a phenol (or a substituted phenol), either with or without a condensing catalyst such as hexamethylenetetramine. As is well known, phenols and aldehydes themselves possess a tendency to condense, and, when the olefinic condensation product of a nonconjugated unsaturated nonhydroxylated aliphatic acid or the like is present, a complex recondensation takes place between the olefinic condensation product, the phenol and the aldehyde. Recondensation proceeds more satisfactorily when the condensation product contains an acid group.

On the other hand, other reactive resin-forming or resinifying substances may be used to replace part of the olefinic condensation product in the recondensation. For example, a mixture of the maleic condensation product of a nonconjugated unsaturated nonhydroxylated aliphatic acid or the like having from ten to twenty-four carbon atoms in its carbon chain with an aliphatic aldehyde, keto carboxylic acid, aldehyde acid, benzoyl-benzoic acid, or benzaldehyde (or other reactive resinifying or resin-forming substance) may be condensed with a phenol or a mixture of a phenol and an aldehyde, with or without the assistance of a condensing catalyst such as hexamethylenetetramine.

The recondensation product obtained by using the olefinic condensation product of a nonconjugated unsaturated nonhydroxylated aliphatic acid or the like having from ten to twenty-four carbon atoms in its carbon chain and some other substance or substances capable of undergoing condensation is so complex that even an approximate statement of its structure at the present time is not to be attempted. For the purpose of illustration, however, I give a specific example of a relatively simple recondensation, with knowledge that persons skilled in the art can readily devise other recondensations to suit particular needs.

EXAMPLE 8

In this example 70 parts by weight of the viscous oil obtained by the interaction of maleic anhydride and linseed oil, as described for instance in Example 1, are mixed with 46 parts by weight of a commercially procurable mixture of xylenols (higher phenols) and 14 parts by weight of hexamethylenetetramine.. The mixture is slowly heated to 150° C., at which temperature a vigorous reaction begins. After the reaction has subsided, the temperature is raised to 200° C., at which point another reaction starts with rapid increase in viscosity of the reaction product. The temperature is held at 200° C. until the mass becomes almost solid.

The recondensation product is a resinous mass, soluble in xylene, which, in the presence of metallic driers, may be stoved to give a hard film, for example at 80° C. It is useful in varnishes and lacquers.

The reaction may be carried out with substituted phenols, such as phenol alcohol (saligenin), with or without a condensing agent, and with or without an aldehyde.

The reaction as described above may be carried out with a great variety of the substances of the types given, and with various quantities and conditions, the change of which is within the skill of a routine experimenter.

The olefinic condensation product of a drying oil as obtained in Example 1, for instance, may be gelled before recondensation. Also, other resins may be incorporated with the gelled condensation product of a drying oil.

An improved varnish or the like may be made by gelling the condensation product of an acyclic olefinic alcohol, aldehyde, acid, ester or alkyl derivative thereof, each having less than ten carbon atoms in the carbon chain, with a drying oil, then incorporating the gelled condensation product with a natural or synthetic resin, and dissolving in a solvent. The gelling may be accomplished by heating of the condensation product.

EXAMPLE 9

Gellation is brought about by heating one hundred parts by weight of the condensation product obtained in Example 1 at 305° C. for 45 minutes. To the gelled condensation product, 75 parts by weight of ester gum are added and the mixture is heated until it becomes uniform. After cooling the mixture to 160° C., 175 parts by weight of petroleum spirits, containing drier, are added.

The varnish thus obtained dries to a clear hard film.

Wood rosin, cumerone, and "run" copal may be used successfully in place of the ester gum.

The first condensation product as obtained for instance in Example 1 is remarkable in its ability to dissolve moderately "run", hard copal, cumerone, hard phenol-formaldehyde and cresol-formaldehyde, which are not soluble in the ordinary solvents. The condensation product of Example 1 will dissolve many of the curable resins in much more advanced stages of curing than the stages at which said resins are soluble in ordinary linseed oil, for example.

In certain cases there is an advantage in having a drier directly combined with the varnish resin. This may be done in accordance with the present invention whether the varnish resin be obtained by recondensing the first condensation product with a phenol or a phenol and an aldehyde, or by gelling the first condensation product and mixing it with a resin. Where the drier is to be incorporated in the varnish resin, an acidic condensation product is produced, for instance as explained in Example 1, and the acidic group of the condensation product is then caused to combine with a suitable metallic compound having drying properties. The metallic compound will ordinarily be an oxide, hydroxide, carbonate or acetate in the presence of water. The common drier metals are lead, cobalt and manganese.

In a typical case the condensation product of Example 1 was treated with oxides of cobalt, manganese and lead in order to introduce 0.03% of cobalt, 0.05% of manganese and 0.5% of lead. The first condensation product was then treated as explained in Example 8 or any of the variants thereof or as explained in Example 9 or the variants of Example 9.

It will be understood of course that the materials produced in accordance with the present invention may be employed in other fields besides the varnish, lacquer and enamel fields. The materials of the present invention may be used for any of a wide variety of uses to which resins and plastics are applied.

For different compounds, some variations in desirable reaction temperatures and pressures will be found.

Wherever I refer herein to resin-forming substances I mean to include resinifying substances also, and when I refer to resinifying substances, I likewise mean to include resin-forming substances.

Throughout the specification and claims, where I refer to nonconjugated unsaturated nonhydroxylated aliphatic acids having from ten to twenty-four carbon atoms in the carbon chain, or salts or esters thereof, I mean such acids, salts or esters as are unoxidized or nonpolymerized or not sufficiently oxidized or polymerized to interfere with the reactions disclosed herein. Thus in referring to linseed oil, I mean the product generally known as such, raw or refined, and not linseed oil sufficiently oxidized or polymerized to prevent or seriously interfere with the formation of a condensation product at a double bond. In other words, I do not intend to exclude others from mere esterification of oxidized or polymerized fatty oils by maleic anhydride.

Many of the fish oils contain varying percentages of fatty alcohols, which will of course react with maleic anhydride to form esters. The esterified fatty alcohols may be allowed to remain in the condensation product, or the alcohols may be removed before condensation takes place.

It will be evident that the condensation product of my invention may be oxidized subsequent to condensation.

Where reference is made to poly-hydric alcohols, it is intended to include di-hydric alcohols. Also, under poly-hydric alcohols, substituted poly-hydric alcohols, such as glycol monoethyl ether, are included. Reference to acids is intended to include acid anhydrides and half esters of acids. Reference to esters is intended to include partially completed esters such as half esters.

When reference is made in the claims to a compound containing the grouping of a nonconjugated unsaturated nonhydroxylated aliphatic acid having from ten to twenty-four atoms in the carbon chain, it is intended to include not only the acid, but also the salts and esters formed from it.

It will be understood that the condensation of minute amounts of the olefinic compound with the nonconjugated unsaturated nonhydroxylated fatty compound will not appreciably change the character of the latter. In general, at least 1% (based on the weight of the condensation product) of the olefinic compound should be combined with the nonconjugated unsaturated nonhydroxylated fatty compound in the product to insure a distinctive character of the product.

In view of my invention and disclosure variations and modifications to meet individual whim or particular need will doubtless become evident to others skilled in the art, to obtain all or part of the benefits of my invention without copying the exact process or product described, and I, therefore, claim all such in so far as they fall within the reasonable spirit and scope of my invention.

Having thus described my invention, what I claim as new and desire to secure by Letters Patent is:

1. The process of forming a condensation product, which comprises reacting with a phenol, the condensation product of one of the first group consisting of acyclic olefinic alcohols, acyclic olefinic aldehydes, acyclic olefinic acids and esters of these and alkyl derivatives of these, all having less than ten carbon atoms in their carbon chains, at a double bond in the carbon chain of one of the second group consisting of nonconjugated unsaturated nonhydroxylated aliphatic acids having from ten to twenty-four carbon atoms in their carbon chains, nonhydroxylated salts and nonhydroxylated esters thereof.

2. The process of producing a condensation product, which comprises reacting with a phenol and an aldehyde, the condensation product of one of the first group consisting of acyclic olefinic alcohols, acyclic olefinic aldehydes, acyclic olefinic acids and esters of these and alkyl derivatives of these, all having less than ten carbon atoms in their carbon chains, at a double bond in the carbon chain of one of the second group consisting of nonconjugated unsaturated nonhydroxylated aliphatic acids having from ten to twenty-four carbon atoms in their carbon chains, nonhydroxylated salts and nonhydroxylated esters thereof.

3. The process of forming a condensation product, which comprises reacting one of the first group consisting of acyclic olefinic alcohols, acyclic olefinic aldehydes, acyclic olefinic acids and esters of these and alkyl derivatives of these, all having less than ten carbon atoms in their carbon chains, at a double bond in the carbon chain of one of the second group consisting of nonconjugated unsaturated nonhydroxylated aliphatic acids having from ten to twenty-four carbon atoms in their carbon chains, nonhydroxylated salts and nonhydroxylated esters thereof, at a temperature in excess of 150° C., mixing with the reaction product a resin-forming substance selected from the third group consisting of aliphatic aldehydes, keto carboxylic acids, and benzaldehyde, and causing the mixture to react with a phenol.

4. The process of forming a condensation product, which comprises combining the grouping

where R is one of the class consisting of hydrogen and alkyl groups and T is one of the class consisting of carboxyl acidic groups, anhydrides thereof and esters of both and the length of the carbon chain

is less than ten carbon atoms, with an unsaturated linkage of one of the group consisting of nonconjugated unsaturated nonhydroxylated aliphatic acids having from ten to twenty-four carbon atoms in their carbon chains, nonhydroxylated salts and nonhydroxylated esters thereof, mixing the reaction product with benzoyl benzoic acid and causing the mixture to react with a phenol and an aldehyde.

5. A reaction product with a phenol, of the condensation product obtained by heating to a temperature above 150° C. one of the first group consisting of acyclic olefinic alcohols, acyclic olefinic aldehydes, acyclic olefinic acids and esters of these and alkyl derivatives of these, all having less than ten carbon atoms in their carbon chains, and one of the second group consisting of nonconjugated unsaturated nonhydroxylated aliphatic acids having from ten to twenty-four carbon atoms in their carbon chains, nonhydroxylated salts and nonhydroxylated esters thereof and thereby combining the one of the first group at a double bond in the carbon chain of the one of the second group.

6. A reaction product with a phenol, of a condensation product of a compound having the grouping

where R is one of the class consisting of hydrogen and alkyl groups and T is one of the class consisting of carboxyl acidic groups, anhydrides thereof and esters of both and the length of the carbon chain

is less than ten carbon atoms, with one of the group consisting of nonconjugated unsaturated nonhydroxylated aliphatic acids having from ten to twenty-four carbon atoms in their carbon chains, nonhydroxylated salts and nonhydroxylated esters thereof.

7. A condensation product comprising one of the group consisting of nonconjugated unsaturated nonhydroxylated aliphatic acids having from ten to twenty-four carbon atoms in their carbon chains, nonhydroxylated salts and nonhydroxylated esters thereof, having linked to the carbon chain grouping

where R is one of the class consisting of hydrogen and allkyl groups and T is one of the class consisting of carboxyl acidic groups, anhydrides thereof and esters of both and the length of the carbon chain

is less than ten carbon atoms, in chemical combination with a phenol and an aldehyde.

8. A condensation product comprising a nonconjugated unsaturated nonhydroxylated fatty acid compound having from ten to twenty-four carbon atoms in the carbon chain and having, linked to the carbon chain, the grouping

where R is one of the class consisting of hydrogen and alkyl groups and T is one of the class consisting of carboxyl acidic groups, anhydrides thereof and esters of both and the length of the carbon chain

is less than ten carbon atoms, the same being reacted with benzoyl benzoic acid and a phenol.

9. The process of forming a condensation product, which comprises reacting one of the group consisting of acyclic olefinic alcohols, acyclic olefinic aldehydes, acyclic olefinic acids and esters of these and alkyl derivatives of these, all having less than ten carbon atoms in their carbon chains, with an oil predominantly consisting of glycerides of linoleic and oleic acids in proportions of not more than enough of the one of the group to saturate all double bonds in the linoleic and oleic acids, at a temperature not less than 150° C. and in excess of the ordinary boiling point of the one of the group with return condensation, and causing the reaction product to react with a phenol.

10. The process of forming a condensation product, which comprises reacting one of the group consisting of acyclic olefinic alcohols, acyclic olefinic aldehydes, acyclic olefinic acids and esters of these and alkyl derivatives of these, all having less than ten carbon atoms in their carbon chains, with an oil predominantly consisting of glycerides of linoleic and oleic acids in proportions of not more than enough of the one of the group to saturate all double bonds in the linoleic and oleic acids, at a temperature not less than 150° C. and in excess of the ordinary boiling point of the one of the group with return condensation, and causing the reaction product to react with a phenol and an aldehyde.

11. A reaction product with a phenol and hexamethylenetetramine, of the condensation product of one of the first group consisting of acyclic olefinic alcohols, acyclic olefinic aldehydes, acyclic olefinic acids and esters of these and alkyl derivatives of these, all having less than ten carbon atoms in their carbon chains and reacted at the unsaturated linkage of one of the second group consisting of nonconjugated unsaturated nonhydroxylated aliphatic acids having from ten to twenty-four carbon atoms in their carbon chains, nonhydroxylated salts and nonhydroxylated esters thereof, said condensation product being obtained at a temperature above 150° C.

EDWIN T. CLOCKER.